United States Patent [19]

Dellinger

[11] Patent Number: 5,077,381

[45] Date of Patent: Dec. 31, 1991

[54] CONSTANT COMPOSITIOIN RECYCLE OF NYLON 6 POLYMERIZATION WASH WATER

[75] Inventor: Jack A. Dellinger, Weaverville, N.C.

[73] Assignee: BASF Corporation, Parsippany, N.J.

[21] Appl. No.: 531,976

[22] Filed: Jun. 1, 1990

[51] Int. Cl.$^5$ ............................................. C08G 69/16
[52] U.S. Cl. ...................................... 528/323; 526/67; 526/70; 528/481; 528/499
[58] Field of Search ........................ 528/323, 499, 481; 526/67, 70

[56] References Cited

U.S. PATENT DOCUMENTS

| | | | |
|---|---|---|---|
| 4,053,457 | 10/1977 | Cordes et al. | 260/78 L |
| 4,310,659 | 1/1982 | Yates et al. | 528/323 |
| 4,327,208 | 4/1982 | Lehr et al. | 528/323 |
| 4,429,107 | 1/1984 | Strehler et al. | 528/318 |
| 4,436,973 | 3/1984 | Strehler et al. | 528/323 |
| 4,537,949 | 8/1985 | Schmidt et al. | 528/335 |
| 4,540,774 | 9/1985 | Gerking et al. | 528/502 |
| 4,816,557 | 3/1989 | Pipper et al. | 528/500 |

OTHER PUBLICATIONS

Panka, G. and van Endert, E., "Raw Material and Energy Savings in Polymer and Fiber Plants", *Fiber Producer*, Jun. 1981, pp. 20, 22, 24 and 26.

Lückert, Dr. H., "New Economic Technologies for the Production of PA 6 Polymer and Filament Yarns", *Chemiefasern Textilindustrie*, Oct., 1984, pp. E 101-104.

Maan, Dr. Ir. C. J., "Manufacture of Nylon 6 Chips", *Fundamentals of Nylon 6 Yarn Manufacture in the Aku--Group*, vol. II, 1965.

Mertel, Strauss, Heilmann, Holy, Taeger, Wiltzer and Luasmann, "Process to Obtain Polyamide-6 Chips from Concentrated Extract Waters of Polyamide-6", East German Patent 213936 (Translation), Jul. 8, 1985.

*Primary Examiner*—Harold D. Anderson

[57] ABSTRACT

A process for preparing polyamides of substantially constant cyclic dimer concentration from amide monomers includes extracting unreacted amide monomers and oligomers, reducing the oligomer concentration relative to the concentration of total extractants and then returning the extract to the reaction vessel in substantially the same total proportion as extracted.

5 Claims, No Drawings

CONSTANT COMPOSITIOIN RECYCLE OF NYLON 6 POLYMERIZATION WASH WATER

BACKGROUND OF THE INVENTION

This invention relates generally to amide polymerizations. More specifically, this invention relates to the recovery and recycle of unreacted amide monomers and oligomers in $\epsilon$-caprolactam polymerizations.

In the polymerization of $\epsilon$-caprolactam, about 10% of the caprolactam monomer remains unreacted. In addition, about 2.5% total cyclic oligomers form. The art has recognized the need to recover and recycle these valuable raw materials. Recovered materials are useful in later polymerization reactions or for other purposes. Further, if left in the polycaprolactam product, residual monomer and oligomers cause undesirable effects in further processing of the polymer product.

A typical recovery process involves hot water extraction of residual monomer and oligomers and recovery of the extractables by evaporating the water. In many cases, a first distillation step isolates the caprolactam monomer while the oligomer is depolymerized and distilled in later steps.

U.S. Pat. No. 4,053,457 to Cordes et al. describes caprolactam recovery. Cordes et al. discloses a process for extracting $\epsilon$-caprolactam and other polyamide-forming starting materials. The extract containing solvent, monomer and oligomers is concentrated in the absence of atmospheric oxygen, the surfaces which come into contact with the extract being made of materials which are inert under the conditions of the concentration process, and the concentrate, without further purification or separation, is polymerized by itself or together with other polyamide-forming compounds.

U.S. Pat. No. 4,540,774 to Gerking et al. discloses a process for continuously demonomerizing and post-polymerizing polycaprolactam melts in a reactor designed for carrying out the process. Demonomerization is by vacuum. Condensed monomers and oligomers may be recycled, in whole or part, to the process origin.

U.S. Pat. No. 4,816,557 to Pipper et al. discloses a process for removing caprolactam monomer and oligomers thereof from nylon granules wherein the nylon granules are heated and superheated steam is passed therethrough in a treatment zone. The steam containing caprolactam and its oligomers is withdrawn from the top of the treatment zone. This steam then passes through a column to yield an aqueous solution of caprolactam and oligomers thereof and caprolactam free steam. According to the disclosure, the steam may be recycled.

As noted, it is known that recycling monomers left unreacted in polymerization reactions is advantageous. For instance, recycling monomer to fresh polymerizations preserves raw materials. In large volume operations, the conservation of raw materials can result in considerable cost savings. Other factors may merit consideration, too. As an example, recycling raw materials avoids the problem of waste disposal, a growing environmental concern.

For example, U.S. Pat. No. 4,537,949 to Schmidt et al. describes a continuous process for preparing certain nylons wherein prepolymer and vapors are continuously separated, the vapors are rectified and the entrained diamines are recycled. Although the Schmidt et al. disclosure does not specifically address $\epsilon$-caprolactam monomers, the teachings recited highlight the importance given to recycling in general.

U.S. Pat. No. 4,429,107 to Strehler et al. discloses a process for continuously preparing polycaprolactam in which $\epsilon$-caprolactam is partially polymerized, with the addition of a water-containing agent and acetic acid or propionic acid as a chain regulator, at a nylon-forming temperature. A gaseous mixture of caprolactam, water and acetic or propionic acid obtained at the top of the reactor is fed to the middle of a column. Water is removed at the top of the column and the bottom of the column is maintained at 125° C. to 145° C. The mixture obtained at the bottom of the column contains caprolactam, acetic or propionic acid and a small amount of water and is recycled to the top of the reactor.

U.S. Pat. No. 4,327,208 to Lehr et al. discloses a process for producing polyamide-6 or corresponding copolyamides by hydrolytic polymerization wherein the low molecular weight secondary reaction products and the unreacted $\epsilon$-caprolactam are separated from the polyamide melt and directly condensed on an $\epsilon$-caprolactam melt intended for polymerization. Reduced pressure and elevated temperature result in the separation of the monomers and oligomers from the polyamide melt. No intermediate treatment of the separated material takes place between separation and condensation. Lehr et al. also discusses the significance of cyclic dimer formation in the polymerization of $\epsilon$-caprolactam.

Cyclic dimer forms during the initial ring opening of $\epsilon$-caprolactam in the polymerization. The cyclic dimer is relatively stable and has a high melting point and low solubility. Moreover, cyclic dimer is not adequately processable at conditions and parameters suitable for polycaprolactam. One of the problems associated with cyclic dimer is its deposition on processing machinery which causes downtime in the mill for equipment cleaning. Much attention has focused on removing cyclic dimer from polyamides, particularly polycaprolactam.

Exemplary is U.S. Pat. No. 4,310,659 to Yates et al. describing a polymerization of $\epsilon$-caprolactam which uses a two stage hydrolysis process. The first stage operates at a first temperature and a first pressure. Before equilibrium conditions are reached a second stage operates at a second temperature and pressure while water is continuously removed. As a result, water (containing hydrophilic extractables) is removed both during hydrolyzation and during the subsequent polycondensation so that the cyclic dimer content of the shaped polymer article is below 0.2 percent by weight.

U.S. Pat. No. 4,436,897 to Strehler et al. discloses a process for preparing polycaprolactam by polymerizing $\epsilon$-caprolactam, and an aqueous extract containing $\epsilon$-caprolactam and caprolactam oligomers. The extract has been obtained by extracting polycaprolactam with water sufficient to achieve an extract containing from 0.1 to 5.0% by weight of oligomers of caprolactam, based on the monomeric caprolactam in the aqueous extract. This extract is then used in later polymerizations. As disclosed, after the above extraction, a second extraction yields residual extract with a higher dimer concentration.

What remains needed is a method for continuously recycling wash water concentrate from amide polymerizations to the reaction vessel in the same proportion as extractables were removed without dilution with virgin monomer prior to concentrating while establishing a cyclic dimer concentration, relative to the reactants, well below its solubility concentration.

SUMMARY OF THE INVENTION

Accordingly, the present invention is a process for recycling wash water extract from the polymerization of ε-caprolactam monomers by extracting organics, including cyclic ε-caprolactam dimer, which remain unreacted in the polymerization to produce an extract representing a proportion of the total weight of organic reactants, hydrolyzing the extract and returning the extract to the polymerization reactor in a proportion by weight which is substantially the same as the proportion in which the organics were extracted.

An advantage of the present invention is an improved polyamide polymerization process.

Related advantages and objects of the invention will be readily ascertainable by the ordinarily skilled artisan after a reading of the following description.

DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications and such further applications of the principles of the invention as discussed are contemplated as would normally occur to one ordinarily skilled in the art to which the invention relates.

In the discussion which follows, the term "extractants" is used to refer to the non-solvent portion of the extract from polycaprolactam production. The term is used without regard to the stage or prior treatment of the extract. Percentages are weight percentages unless otherwise designated.

In the following description, the cyclic dimer of ε-caprolactam concentration has been measured by gas chromatography. One suitable method is described more throughly below. Of course, other analytical methods and instruments might be used.

The present invention applies to polycaprolactam production according to any acceptable method known to those ordinarily skilled in the relevant art. In addition, the present invention is useful in copolymerizations of ε-caprolactam with other monomers. Further, the present invention is advantageously used in any polymerization producing troublesome side products which are capable of hydrolysis or similar breakdown to less troublesome forms and wherein it is desirable to recycle unreacted starting materials.

In practice, the present invention generally involves the step of extracting unreacted caprolactam monomer and oligomers from polymerized ε-caprolactam. The resulting extract is typically then concentrated. This concentrated extract is commonly known as concentrated wash water. Heat and pressure are then applied to the concentrated wash water for a period of time and the cyclic dimer concentration is accordingly reduced. The concentrated wash water having reduced cyclic dimer concentration is then returned to the reaction vessel without further dilution and in an amount such that the extractants are returned to reaction vessel as about the same fraction as removed. Stated another way, if about 10% of the original polymeric product was extracted, the extractants are returned to the reaction vessel as about 10% of the new charge of reactants.

The extraction of polymerized caprolactam results in an extract having approximately 10% total organics by total weight of the extract, including the weight of the extracting solvent. These total organics typically include about 6 to 8 percent monomer and about 2.5 percent cyclic oligomers of which about 0.5 percent is cyclic dimer. The extractables represent approximately 10% of the monomer initially charged to the reaction vessel.

Water is commonly the extracting solvent of choice. Acceptable substitutes for water will be readily apparent to those of ordinary skill. For example, steam may be used and later condensed. When water is used, an acceptable rate of water usage is, for example, about 0.8 to 2.0 liters per kilogram.

The extract is then typically concentrated by evaporating the solvent to recover the extractables. After concentration, the extract or concentrated wash water contains approximately 80% total organics. Of this approximately 5%, more or less, represents cyclic dimer.

According to the present invention, the concentrate is then hydrolyzed to reduce the cyclic dimer concentration. Presently this is accomplished by charging the concentrated wash water to a pressure reactor where it is heated under pressure for a period. After treatment in the pressure reactor, the cyclic dimer concentration can be reduced from about 5% to approximately 1.3%, more or less.

Hydrolysis of cyclic dimer preferably takes place under autogenous pressure of an aqueous solution containing about 80% organics. The preferable temperature for the hydrolyzation is between about 220° C. and about 290° C. and is most preferably about 265° C. The hydrolyzation may be allowed to proceed for any period of time which is suitable to adequately reduce the cyclic dimer concentration. This time is, for example, preferably from about 2 to about 6 hours, and most preferably is in about the 4-hour range.

Once the hydrolysis of the dimer is complete the resulting wash water concentrate with reduced cyclic dimer concentration may be returned to the reactor as starting material for the next polymerization. It is contemplated that extractables will be removed continuously from the product polymer, hydrolyzed and returned to the reaction vessel as part of the continuous raw material feed.

According to the invention, the hydrolyzed material is preferably returned to the reactor in about the same proportion as it was removed from the polymer in order to maintain a constant composition of the cyclic dimer which is well below its equilibrium concentration. For example, if the total organic content of the unconcentrated extract is about 10% then the concentrated extract which has been hydrolyzed should be returned to the reactor in an amount which is approximately 10% of the total raw material charge. About ninety percent (90%) of the caprolactam charge is, for example, virgin caprolactam and other fresh starting materials. The cyclic dimer concentration is accordingly approximately 0.13% of the total material charge.

Because the hydrolyzed extracted cyclic dimer is recycled at a rate substantially the same as the extraction rate, the concentration of cyclic dimer will not reach its equilibrium concentration of approximately 1.3%. After the second introduction of recycled material, an approximately steady concentration of dimer results. By way of illustration, if each polymerization cycle forms about 0.5% new cyclic dimer and approximately 0.13% cyclic dimer is returned in the recycled extract (according to the description above), then the concentration of cyclic dimer in the polymeric product will not exceed about 0.63%, a concentration well below the equilibrium concentration of cyclic dimer. Of course, if the process of the present invention is used in other than the production of homopolymeric polycaprolactam, these concentration values will vary respectively.

The invention will now be further described by reference to the following more detailed examples. The examples are set forth by way of illustration and are not intended to limit the scope of the invention.

DETERMINATION OF CYCLIC DIMER IN NYLON BY GAS CHROMATOGRAPHY

A 10-gram sample of nylon is refluxed in 100 ml of methanol for 3 hours. When the mixture is cool, 5 ml of methanol is added through the top of the condenser. The sample is centrifuged and the methanol extract is then injected into a gas chromatograph for analysis of cyclic dimer. Quantitation is by external calibration. Calibration standards containing 0.03%, 0.5% and 0.08% cyclic dimer are prepared by adding to 10 ml of methanol 0.003, 0.005 and 0.008 grams of cyclic dimer, respectively.

SAMPLE PREPARATION 10 grams of sample are weighed into a 250 ml Erlenmeyer flask. Chips should be ground before refluxing and yarn should be cut into small pieces. One hundred (100) ml of methanol is added to each sample flask. The mixture is refluxed for 3 hours and when cool, 5 ml of methanol is added to the top of the condenser. The mixture is centrifuged.

CALIBRATION CURVE

Using a 10 uL syringe with a chaney adaptor, 1 uL of each standard is injected into a Varian Model 3700 gas chromatograph equipped with a flame ionization detector and a 6 ft glass ¼ inch OD by 2 mm ID column, packed with 3% OV 17 on Gas Chrom Q, 80/100 mesh. The carrier gas is helium at between 30 to 40 mL/minute. The column temperature is between 215° C. to 220° C. The injector temperature is 280° C. and the flame ionization detector is maintained at 280° C. Each standard is injected at least twice. The cyclic dimer peak areas are calculated and averaged. A standard calibration curve results by plotting the cyclic dimer peak area versus concentration in weight/volume percent.

SAMPLE CONCENTRATION 1.0 uL of each sample is injected at least twice and the cyclic dimer peak area recorded. Peak areas are averaged.

CALCULATIONS

The concentration of cyclic dimer in the sample is calculated using the following equation:

$$C = \frac{A \times V}{W}$$

C = concentration of cyclic dimer in the sample (wt. %)
A = concentration of cyclic dimer in sample solution read from calibration curve (wt/vol %)
V = Total volume of methanol added, mL
W = Weight of sample, g.

EXAMPLE 1

Extraction of Nylon 6 and Hydrolyzation of the Extract

Polycaprolactam pellets containing about 12.5 wt % extractable material, monomer and oligomers, are extracted with water at a temperature of about 97° C. at a rate of 1.2 liter of water per kilogram of pellets. Caprolactam and cyclic dimer concentrations are determined by gas chromatography after the method described above. The concentrations of higher cyclic and linear oligomers are determined by difference. Total organics are determined by methanol extraction and subsequent analysis by the Kjeldahl method. After extraction the pellets contain about 1.0% extractables and the water contains about 7.9% organics of which about 7.2% is caprolactam and 0.4% is cyclic dimer. The remainder of the organics are higher cyclic and linear oligomers of polycaprolactam.

The extract water is concentrated by evaporation to give concentrated wash water containing about 80% organics of which 66.8% is caprolactam, 3.5% cyclic dimer and the remainder is higher cyclic and linear oligomers.

These concentrated extract waters are then heated in a sealed tube in a Paar autoclave at 265° C. under autogenous pressure for 4 hours. The autoclave is cooled to room temperature and the contents of the tube are determined to contain 8.6% caprolactam and 1.3% cyclic dimer. The remainder of the organics are in the form of aminocaproic acid and other nylon oligomers.

EXAMPLE 2

Polymerization of Virgin ε-Caprolactam 30 grams of ε-caprolactam is charged into a polymerization reactor along with 1 gram of water and 2 drops phosphoric acid. The polymerization initiates and continues for 16 hours at 260° C. A nitrogen blanket is maintained during the polymerization. After this time the reactor is purged with nitrogen. The polymerized material is extruded, cooled, ground into chips and analyzed. Results are presented in Table 1.

EXAMPLE 3

Polymerization of ε-Caprolactam Recovered From Wash Water (Wash Water Unhydrolyzed)

26.7 grams of ε-caprolactam is charged to a polymerization reactor along with 4.1 grams (13% of charge) of unhydrolyzed wash water concentrate and 2 drops phosphoric acid. The wash water concentrate is prepared by extraction and in concentration substantially according to Example 1, but without hydrolysis. The mixture is polymerized according to the method described in Example 2. Results of an analysis appear in Table 1.

EXAMPLE 4

Polymerization of ε-Caprolactam Recovered From Wash Water (Wash Water Hydrolyzed)

26.7 grams of ε-caprolactam is charged to a polymerization reactor along with 4.1 grams (13% of charge) of hydrolyzed wash water concentrate and 2 drops phosphoric acid. The wash water is prepared by extraction, concentration and hydrolyzation substantially according to the procedure described in Example 1. The polymerization is according to Example 2. Results of an analysis appear in Table 1.

EXAMPLE 5

Polymerization of ε-Caprolactam Recovered From Wash Water (Polymerization Mixture Hydrolyzed)

26.7 grams of ε-caprolactam is charged to a polymerization reactor along with 4.1 grams (13% of charge) of unhydrolyzed wash water concentrate and 2 drops phosphoric acid. The wash water concentrate is prepared by extraction and concentration, but not hydrolysis, according to Example 1. The entire mixture is autoclaved at 265° C. for 4 hours. It is then ground into chips and polymerized according to the procedure stated in Example 2. Results of an analysis appear in Table 1.

TABLE 1

| Example | % Lactam | % CD | RV* | % Extractable |
|---------|----------|------|------|---------------|
| 2 | 8.16 | .62 | 3.06 | 9.90 |
| 3 | 8.10 | .92 | 3.08 | 10.45 |
| 4 | 7.32 | .63 | 2.64 | 10.18 |
| 5 | 5.30 | .97 | 2.76 | 8.85 |

*1 gram polymer per deciliter of 96% sulfuric acid.

From this data, it is apparent that, in accordance with the present invention, wash water can be recycled to the fresh reactor charge without causing the cyclic dimer to reach or exceed its equilibrium value.

EXAMPLE 6

Continuous Polymerization of ε-Caprolactam

In a one-stage VK-tube a polymer is produced from 30 grams of ε-caprolactam, 1 gram water and 2 drops phosphoric acid after 16 hours at about 260° C. The polymer is cooled and made into chips. The chips are extracted with water to obtain extractable material representing about 12.5 wt % of the polycaprolactam pellets. Analysis of this extract reveals that it contains about 0.4% cyclic dimer.

The extracted water is concentrated by evaporation to give a concentrated wash water containing about 80% organics of which 66.8% is caprolactam, 3.5% cyclic dimer and the remainder is higher cyclic and linear oligomers. This concentrated extract is heated in a sealed tube in a Paar autoclave at about 265° C. for 4 hours. The autoclave is cooled to room temperature and the contents of the tube are determined to contain about 8% caprolactam and about 1.3% cyclic dimer.

The resulting hydrolyzed wash water (3 grams) is added to a fresh charge of caprolactam (27 grams) in an amount representing about 10 wt % of the total charge.

The mixture is polymerized as described above. The polymer produced is cooled, cut into chips and analyzed. It contains about 0.53% cyclic dimer.

What is claimed is:

1. In a process for preparing polyamides from caprolactam in a reaction vessel, the improvement comprising:
    extracting from the polyamide unreacted caprolactam and caprolactam oligomers to yield an extracted proportion by weight based on total reaction charge;
    reducing the oligomer concentration of the extracted proportion relative to the total extract concentration by subjecting the extracted proportion to elevated temperature between about 220° C. and about 290° C.; and
    then returning the extracted proportion to the reaction vessel as substantially the same proportion as extracted by weight based on the total reaction charge.

2. The process of claim 1 wherein said reducing is by subjecting said extracted proportion to superambient pressure at about 265° C. for about 4 hours.

3. A process for recycling wash water extract from polymerization of ε-caprolactam monomers in a reaction vessel, comprising the steps of:
    (a) extracting organics which remain unreacted in the polymerization and which include cyclic ε-caprolactam dimer, to produce an extract representing a proportion of the total weight of organic reactants;
    (b) concentrating the resulting extract;
    (c) subjecting the resultant concentrated extract to superambient pressure and temperature of about 265° C.; and
    (d) returning the resultant concentrated extract to the reaction vessel in a proportion by weight substantially the same as the proportion in which the organics were extracted.

4. The process of claim 3 wherein the concentrated an subjected extract contains about 1.3% cyclic dimer by weight.

5. A method of maintaining recycled ε-caprolactam cyclic dimer below equilibrium concentration in the polymerization of caprolactam in a polymerization reactor comprising:
    (a) extracting unreacted cyclic dimer from the polymerization reactor to yield an extract;
    (b) concentrating the extract prior to said returning;
    (c) hydrolyzing the extract by subjecting the extract to superambient pressure and superambient temperature of about 265° C.; and
    (d) returning the hydrolyzed extract to the polymerization reactor in substantially the same proportion as removed.

* * * * *